May 26, 1931. N. A. CHRISTENSEN 1,807,151
BRAKE APPARATUS
Filed June 17, 1925   2 Sheets-Sheet 1
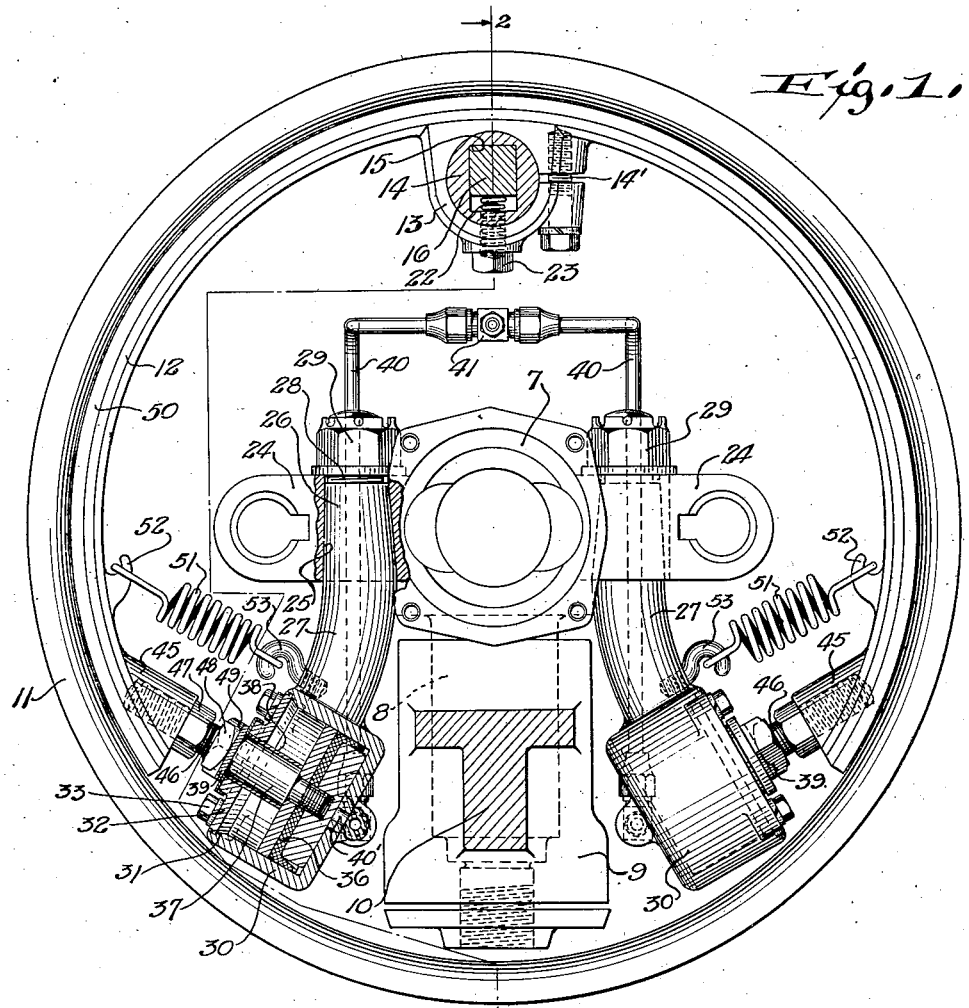
Niels A. Christensen
INVENTOR.
BY Quarles & French
ATTORNEYS

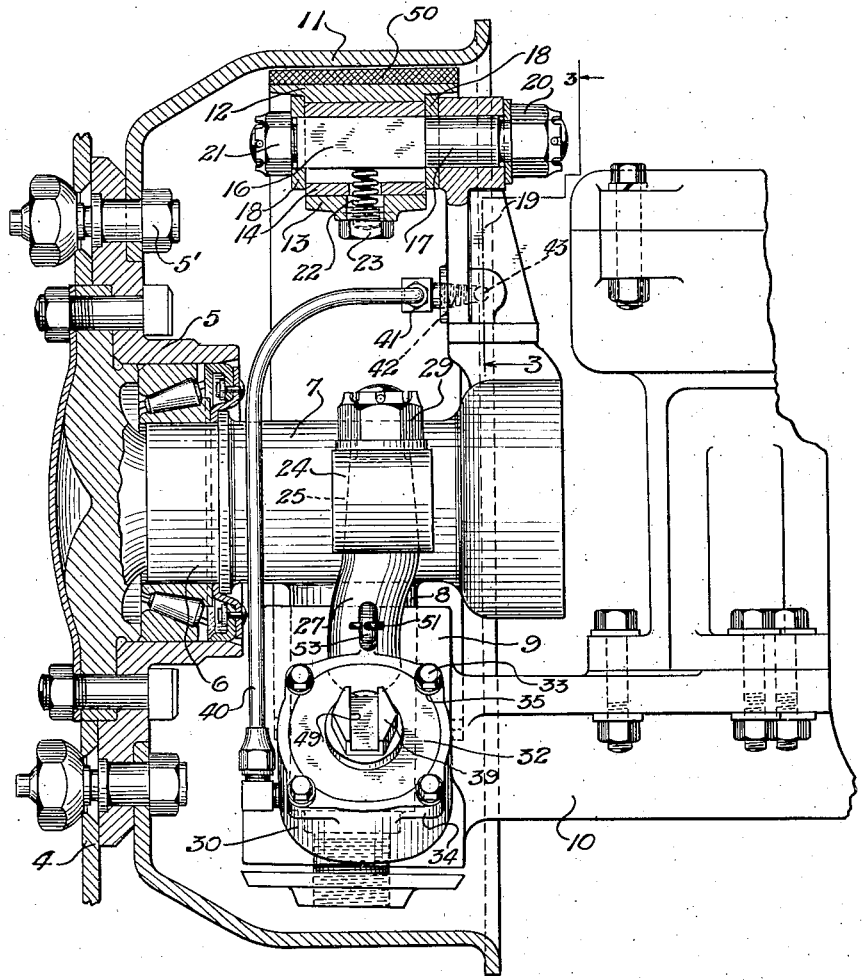

Patented May 26, 1931

1,807,151

UNITED STATES PATENT OFFICE

NIELS A. CHRISTENSEN, OF MILWAUKEE, WISCONSIN

BRAKE APPARATUS

Application filed June 17, 1925. Serial No. 37,703.

The invention relates to vehicle brakes, and more particularly to those brakes for use with automotive vehicles and trailers for such vehicles.

The object of the invention is to provide a fluid-pressure-operated brake mechanism which may be readily applied to, or used in connection with, front or dirigible steering wheels of road vehicles of the automotive type.

A further object of the invention is to provide a brake-mechanism in which the brake cylinder is formed integral with or connected to a supporting arm in the form of a tapered pin, which is secured to a part associated with the steering knuckle of the vehicle wheel.

The invention further consists in the several features hereinafter set forth and more particularly defined by claims at the conclusion hereof.

In the drawings: Fig. 1 is a view of brake mechanism embodying the invention, looking into the drum from its inner side, parts being broken away and parts being shown in section;

Fig. 2 is a composite section taken on the line 2—2 of Fig. 1;

Fig. 3 is a detail sectional view taken on the line 3—3 of Fig. 2.

Referring to the drawings the numeral 4 designates the web portion of a disk wheel secured to a hub 5 mounted on the wheel spindle 6 of the oscillatory knuckle 7 having a spindle 8 journalled in a bearing arm 9 of the front axle 10.

A brake drum 11 is removably secured to the hub 5 by bolts 5', and a brake-shoe or band 12 cooperates with said drum. The medial portion of the shoe 12 has a split boss 13 in which an anchor bearing 14 is clamped by the bolt 14', said bearing having a square slot 15 in which the squared end 16 of the anchor pin 17 is slidably mounted.

The anchor pin 17 carries washers 18 which engage the bearing and prevent the mid-portion of the brake member from moving laterally relative to the drum. The shank of the pin 17 extends through a hole in a lug 19 forming part of the front axle 10 and is clamped thereto by a nut 20, while nut 21, on the outer end of the pin, retains the front washer 18 in position.

A brake release spring 22 is interposed between said anchor pin and a screw cap 23 on the boss, and extends through an opening in the bearing.

The steering knuckle is provided with laterally-extending arms 24 formed integral therewith or secured thereto, and each of these arms has a tapered hole 25 to receive the tapered pin portion 26 of a brake cylinder arm 27, the outer end 28 of said arm being threaded to take the nut 29 which draws the pin portion into wedging engagement with the arm 24 and holds it in this position.

Each brake cylinder 30 is formed integral with the arm 27 and is recessed at 31 to take the head 32 which is clamped thereto by bolts 33 whose shanks are mounted in bosses 34 of the cylinder, and whose heads engage washers 35 that project over a part of said head.

A suitably packed piston 36 works in each brake cylinder and carries a piston rod 37 having a sleeve-bearing portion 38 slidably mounted in said head 32. The outer end of the piston rod has an enlarged polygonal slotted head 39. Compressed air or other suitable pressure fluid is admitted to the front ends of the cylinders, through passages 40', by pipes 40 connected by a T-fitting 41 with a duct 42 formed in the lug 19, which duct connects with a duct 43 having a flexible tube-fitting 44 connected therewith.

Each end of the brake member is provided with a lug 45 having a threaded bore to take a jackscrew 46 which is secured in adjusted position by means of a lock-nut 47, and the head 48 of this screw is flattened to engage the straight slot 49 in the head 39 of the piston rod, this slot being disposed parallel to the disk portion of the drum to keep the ends of the brake member in lateral alinement therewith.

The brake member is provided with a suitable brake lining 50 and its ends are normally held in a release position by springs 51. Each spring is connected at one end to a hook lug 52 on the brake member and at its other end to a hook 53 whose shank has threaded engagement with the arm 27. Thus, the springs 51 and the spring 22 normally act to release the brake from engagement with the drum.

When compressed air, or other suitable pressure media, is introduced into the brake cylinders from the pipes 40, the pistons 36 with the rods 37 move outwardly and act upon the ends of the brake through thrusting engagement with said screws 46 to move the brake member into engagement with the drum 12.

I desire it to be understood that this invention is not to be limited to any particular form or arrangement of parts except as such limitations are specified in the claims or necessitated by the prior art.

What I claim as my invention is:

1. In brake mechanism of the character described, the combination with a wheel and its brake drum, of an oscillatory support for the wheel provided with laterally-extending arms, a brake member, fluid-pressure-operated motors associated with the ends of said brake member, each motor including a brake cylinder and an arm integral therewith and attached to one of the arms of said wheel support, and release means for said brake member.

2. In brake mechanism of the character described, the combination with a vehicle wheel and its brake drum, of a support for the wheel provided with laterally extending arms, a brake member engageable with said drum, fluid-pressure-operated motors associated with the ends of said brake member and acting directly thereon, each motor including a brake cylinder and an arm integral therewith and rigidly attached to one of the arms of said wheel support, and release means for said brake member.

In testimony whereof, I affix my signature.

NIELS A. CHRISTENSEN.